(No Model.)

F. A. E. WENZEL & E. A. STRATTON.
HOSE COUPLING.

No. 585,014. Patented June 22, 1897.

Witnesses
R. H. Newman
Harriet Slason

Inventors:
FREDERICK A. E. WENZEL
and EDWARD A. STRATTON
Chamberlain & Newman Attorneys

UNITED STATES PATENT OFFICE.

FREDERICK A. E. WENZEL AND EDWARD A. STRATTON, OF DANBURY, CONNECTICUT.

HOSE-COUPLING.

SPECIFICATION forming part of Letters Patent No. 585,014, dated June 22, 1897.

Application filed June 29, 1896. Serial No. 597,409. (No model.)

*To all whom it may concern:*

Be it known that we, FREDERICK A. E. WENZEL and EDWARD A. STRATTON, citizens of the United States, and residents of Danbury, in the county of Fairfield and State of Connecticut, have invented certain new and useful Improvements in Hose-Couplings, of which the following is a specification.

This invention relates to new and useful improvements in hose-couplings, such, for instance, as garden, fire, or other flexible hose commonly used to convey water under pressure.

It is the object of our invention to simplify and cheapen the construction of articles of the above class and to improve their efficiency in the matter of preventing leakage and affording resistance against lateral strain, and in general to produce a more desirable and practical coupling.

With the above object in view we have devised the novel and simple construction shown in the accompanying drawings, upon which similar characters of reference denote like or corresponding parts upon the several figures, of which—

Figure 1:
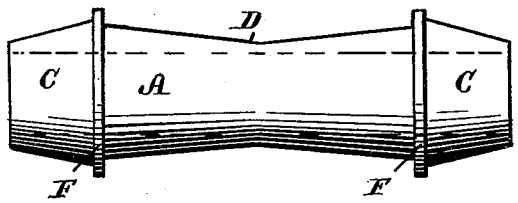
Figure 2:
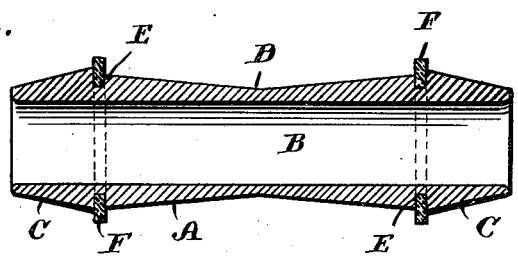
Figure 3:
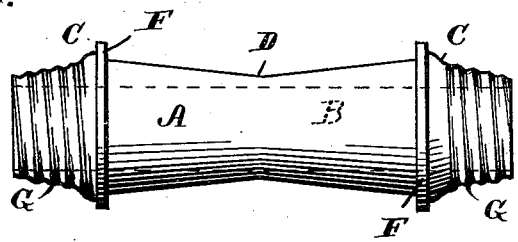
Figure 4:
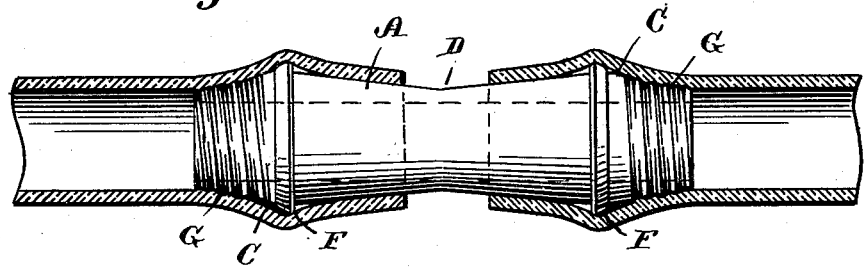
Figure 5:
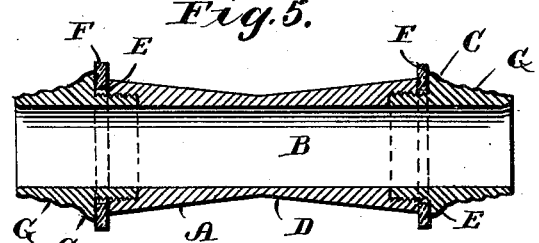

Figure 1 shows a side elevation of our improved coupling detached. Fig. 2 is a central vertical longitudinal section of the construction shown in Fig. 1. Fig. 3 is a view similar to Fig. 1, but differing in that its tapering peripheral ends are threaded to insure a more positive insertion of said coupling into the connecting ends of the hose. Fig. 4 is a view similar to Fig. 3, the coupling, however, being shown attached to the connecting ends of a hose-pipe. Fig. 5 is a central vertical sectional view showing a slightly-modified form of the invention.

As will be apparent, our invention may be carried into effect by means of a small length of pipe having tapering peripheral ends and flexible rings encircling the enlarged diameter of said ends. Said coupling may be constructed of a single piece of wood or metal, as shown in Fig. 2, having a flexible ring on each end thereof, or it may be constructed in three parts, as shown in Fig. 5, and provided with heavier rings.

Referring to the letters of reference marked upon the drawings, A indicates the coupling as a whole; B, a central passage therethrough; C, tapering peripheral ends which are forced into the ends of the hose.

D indicates a concave central peripheral portion, and E annular peripheral recesses adjacent to the ends and encircling the greatest diameter thereof.

F indicates suitable flexible rings which are of a proper dimension to snugly fit into said recesses E, as clearly appears in Fig. 2 of the drawings. These rings F may be made of such material as will allow their outer edges to be curled over and backward to bind against the inner wall of the hose, as shown in Fig. 4. In practice we find that rubber or vulcanized fiber are best adapted for these rings and consequently are what is being used. It is also a fact that it is almost impossible to separate a hose when once united by our improved coupling without tearing the hose or defacing the rings, which latter, however, are capable of standing an enormous strain.

While it is not absolutely essential, we prefer to provide the peripheral tapering ends of the coupling with a spiral thread G, as shown in Figs. 3, 4, and 5 of the drawings. These threads are designed for the purpose of insuring a positive and convenient means of attachment of the coupling to the hose, but do not necessarily form essential features of our invention.

It will be obvious that by inserting the end of our coupling into the hole of a hose-pipe and screwing or otherwise forcing the end of said coupling therein said hose will be spread open upon the coupling until the end of the hose is forced up against the flexible ring before mentioned. The above engagement will cause the ring to be bent back and over upon the periphery of the coupling, as is fully shown in Fig. 4 of the drawings, whereupon by a continued inward pressure of the coupling said end of the hose will be forced over said ring and the enlargement, and by reason of the elasticity of said hose its end will be drawn down snugly upon the concave periphery of said coupling. It will further be apparent that when the coupling is properly inserted, as above, and the flexible rings F turned backward the outer edges *a* of said ring will tightly bind and wedge themselves upon the inner walls of the hose in such a manner as to offer a great resistance to the same being drawn off of the coupling. In fact, in practice we have found that it is almost impossible to remove a coupling of this kind from a hose without tearing or defacing the same.

The form of coupling illustrated in Fig. 5 is constructed to meet the requirements of a larger size of hose, wherein the strain is greater and in which form the flexible rings are heavier. Owing to the increased size and flexible resistance of said rings, it would be difficult to place the same in their recesses by stretching the same sufficiently to force them over the enlargement of the ends, as is done in the construction shown in the other figures. Therefore we form the ends in separate pieces and screw them into the main body.

Having thus described our invention, what we claim, and desire to secure by Letters Patent, is—

1. As a new article of manufacture, a hose-coupling consisting of a pipe provided with tapering peripherally-threaded ends and a reduced central portion, a flexible ring secured to and encircling said ends and adapted to be turned backward by the application of a hose.

2. As a new article of manufacture, a hose-coupling consisting of a pipe having free ends adapted to enter the connecting ends of a hose, annular recesses in said pipe adjacent to its ends, flexible rings within said recesses and adapted to engage the inner walls of a hose by the introduction of a coupling therein, a concave recess encircling said pipe adjacent to the washer aforesaid.

3. As a new article of manufacture, a hose-coupling consisting of a pipe having tapering ends, a concave recess encircling the middle of said pipe, flexible rings fitted to the enlarged portions of the inclines and adapted to enter the hose with the coupling.

Signed at Danbury, in the county of Fairfield and State of Connecticut, this 23d day of June, A. D. 1896.

FREDERICK A. E. WENZEL.
EDWARD A. STRATTON.

Witnesses:
A. McPHELEMY,
W. C. DUFRANE.